United States Patent [19]

Holloway et al.

[11] 4,227,648
[45] * Oct. 14, 1980

[54] CENTER PIVOT IRRIGATION SYSTEM HAVING APPARATUS FOR IRRIGATING CORNERS

[75] Inventors: Huland L. Holloway, Melbeta; Edward M. Norum, Jr., Gering, both of Nebr.

[73] Assignee: Lockwood Corporation, Gering, Nebr.

[*] Notice: The portion of the term of this patent subsequent to Jul. 17, 1996, has been disclaimed.

[21] Appl. No.: 968,835

[22] Filed: Dec. 12, 1978

Related U.S. Application Data

[63] Continuation of Ser. No. 778,470, Mar. 17, 1977, Pat. No. 4,161,292.

[51] Int. Cl.$^2$ .............................................. B05B 3/12
[52] U.S. Cl. ................................... 239/11; 239/177; 239/DIG. 1
[58] Field of Search .................... 239/DIG. 1, 11, 177, 239/212, 99, 70, 67, 68; 137/344

[56] References Cited

U.S. PATENT DOCUMENTS

| | | | |
|---|---|---|---|
| 2,545,928 | 3/1951 | Martin et al. | 239/70 X |
| 2,604,359 | 7/1952 | Zubach | 239/177 X |
| 3,352,493 | 11/1967 | Curtis | 239/177 |
| 3,589,604 | 6/1971 | Paul | 239/11 |
| 3,608,826 | 9/1971 | Reinke | 239/177 |
| 3,628,729 | 12/1971 | Thomas | 239/177 |
| 3,750,953 | 8/1973 | Reinke | 239/177 |
| 3,797,517 | 3/1974 | Kircher et al. | 239/212 X |
| 3,802,627 | 4/1974 | Seckler et al. | 239/212 |
| 3,902,668 | 9/1975 | Daugherty et al. | 239/177 |
| 3,921,908 | 11/1975 | Zimmerer | 239/177 |
| 3,979,062 | 9/1976 | Christensen et al. | 239/177 X |
| 3,979,062 | 9/1976 | Christensen et al. | 239/11 |
| 4,011,990 | 3/1977 | Meis et al. | 239/177 X |
| 4,033,508 | 7/1977 | Jacobi et al. | 239/177 |

Primary Examiner—Robert W. Saifer
Attorney, Agent, or Firm—Arnold, White & Durkee

[57] ABSTRACT

A center pivot irrigation system has first and second auxiliary nozzles, or end guns, aternately operable for irrigating substantial portions of corner regions. The system includes a main pipeline sprinkler having main fluid discharges nozzles for irrigating a central, generally circular area, and the end guns are connected to the main pipeline sprinkler and draw irrigation fluid from it. When a corner is approached, one of the end guns is actuated while maintaining actuation of the main fluid discharge nozzles. A short period of time thereafter, the second end gun is actuated, and the pivotal rate of the main pipeline sprinkler is reduced to zero. At this time the main fluid discharge nozzles and the first end gun are closed, thereby providing all of the fluid from the main pipeline sprinkler to the operating end gun. After a predetermined time period, the second end gun is inactivated, the first gun and the main nozzles are reactivated, and the system is pivoted to a new orientation. After several such sequences and the corner has been passed, only the main nozzles are actuated until another corner is approached. Timers are provided for determining the duration of the periods during which the irrigation fluid is being discharged through the various nozzles, thereby to allow effective control of the amount of irrigation fluid discharged.

17 Claims, 7 Drawing Figures

CENTER PIVOT IRRIGATION SYSTEM HAVING APPARATUS FOR IRRIGATING CORNERS

This is a continuation of application, Ser. No. 778,470, filed Mar. 17, 1977 and now U.S. Pat. No. 4,161,292.

BACKGROUND OF THE INVENTION

The present invention relates generally to center pivot irrigation systems, and more particularly to center pivot irrigation systems which are adapted to selectively provide irrigation to substantial portions of corner regions.

Center pivot irrigation systems for irrigating large areas, such as agricultural areas, are now well known. For example, the model 2200 center pivot irrigation system, commercially marketed by Lockwood Corporation, Gering, Nebr., irrigates approximately 130 acres about a center using an elongated main pipeline sprinkler having a plurality of main fluid discharge nozzles which are spaced along the main pipeline. This system has proven to be advantageous for irrigating the inner acres of a rectangular plot. However, for the rectangular plot substantial areas in the corners are not irrigated by the center pivot sprinkler system. Accordingly, it is highly desirable to provide apparatus for adapting such a now conventional center pivot irrigation system into a system which additionally will irrigate much of the corner areas lying outside the generally circular area.

Various corner irrigating systems for use with center pivot irrigation systems have been proposed. One such proposal suggests the utilization of an electrically actuated water gun disposed on the end of the main pipeline sprinkler. Actuation of the end gun applied irrigation fluid from the main pipeline sprinkler to areas outside the main circular area. The end gun was to be actuated upon a particular orientation of the main pipeline sprinkler as a corner was approached, and was to be maintained in actuation until the main pipeline sprinkler swept past the corner. Although such a proposal may have been an improvement over systems without corner irrigation apparatus, it failed to account for the effect of the drain of the end gun on the rate of discharge of the main pipeline sprinkler. Furthermore, use of only a single end gun in the corner areas provided only a single level of improvement over the then existing systems, leaving substantial corner portions still unirrigated unless areas outside the corners also received irrigation.

Other proposals for irrigating corner sections have suggested the use of an auxiliary sprinkler system mounted on a controllably moving boom. The boom was pivotally connected to the distant end of the main pipeline sprinkler and carried auxiliary nozzles. In such proposals, the boom would pivot outwardly in the corner areas and the auxiliary sprinkler system would be actuated for irrigating the portions of the corner areas lying outside the inner circular area. These systems have either required a rather sophisticated drive mechanism which was programmed to cause the boom to swing in and swing out in the corner areas, and/or such systems required a buried conductor which served to guide the boom outwardly and inwardly in corner regions. The systems according to these proposals have not received full commercial acceptance and success because they have been relatively expensive and costly to service.

One of these proposed systems having such a boom type auxiliary sprinkler system suggested that, while advancing the auxiliary boom inwardly and outwardly, the pivotal rate of the main pipeline sprinkler should be reduced. This reduction in pivotal rate was to maintain sufficient water pressure supplied to the systems such that a special subsystem for regulating the rate of discharge from the various nozzles could be maintained operable and thus be utilized. This system did not recognize the advantages which could be achieved by operating the auxiliary sprinkler system only when the main pipeline sprinkler was neither pivoting nor providing irrigation fluid to the inner circular area.

SUMMARY OF THE INVENTION

The above noted and other disadvantages of the prior art are overcome by providing a center pivot irrigation system having an auxiliary sprinkler system which dispenses water when the main pipeline sprinkler is neither pivoting nor dispensing irrigation fluid. By mounting the auxiliary sprinkler directly onto the main pipeline sprinkler, the amount of extra hardward required is minimized, thereby lowering manufacturing and maintenance costs as well as obviating the otherwise required extra wheel tracks associated with prior art corner irrigating systems. By stopping the pivotal rate of the main pipeline sprinkler during operation of the auxiliary sprinkler, the irrigating fluid supplied to the main pipeline sprinkler is sufficient in amount and pressure to supply the demands of the auxiliary sprinkler, thereby obviating the otherwise need for booster pumps or modified pumps. The auxiliary sprinkler system is adapted for use on existing systems which are to be converted for corner watering.

According to one embodiment of the invention, a center pivot irrigation system includes a main pipeline sprinkler which is rotatable about a center and which has a plurality of main fluid discharge nozzles spaced therealong for controllably providing fluid to a central, generally circular area. The system has a signal generator for producing control signals in response to and indicative of the rotational position of the main pipeline sprinkler about the center.

A drive mechanism rotates or pivots the main pipeline sprinkler is response to the control signals. It pivots the main pipeline sprinkler at a substantially constant first rate for irrigating non-corner areas, and at an intermittent rate for irrigating the corner areas. The intermittent rate is defined in part by periods of predetermined duration during which the main pipeline sprinkler is not pivoting. The system features an auxiliary sprinkler having at least one auxiliary nozzle at the end of the main pipeline sprinkler and which draws its irrigation fluid from the pipeline sprinkler. The auxiliary nozzle is operated by the control signals for irrigating the corner areas only during the periods of nonrotation of the main pipeline sprinkler.

According to another aspect of the invention, the described embodiment includes a main nozzle control mechanism for selectively closing the main discharge nozzles during the periods when the main pipeline sprinkler is not rotating. This allows the source of water supplied to the main pipeline sprinkler to be sufficient in pressure and volume for operating the auxiliary nozzles without the need for booster pumps. This feature also allows corner irrigation to be achieved at a reduced brake horsepower and a reduced irrigation supply outflow capacity.

According to another feature of the invention, the described embodiment further utilizes a main conduit for providing water for both the main nozzles and to the auxiliary nozzle. Because the main nozzles may be selectively closed, and because the remote end of the main pipeline sprinkler is adapted to be directly connected to another such main pipeline sprinkler, increased versatility is achieved which allows one main pipeline sprinkler to be converted into a fluid carrying conduit which only transports the irrigating fluid to the second main pipeline sprinkler.

According to another embodiment of the invention, the auxiliary sprinkler includes both first and second auxiliary nozzles. One nozzle is operated or opened when the main pipeline sprinkler is pivoting while the second nozzle is operated only when the pivotal or rotational rate of the main pipeline sprinkler becomes zero. The one nozzle provides a spray of a lesser range and volume and is operated alternately of the second auxiliary nozzle which provides a spray of an extended range and volume. By operating the lesser range nozzle first and then by operating the extended range nozzle, not only greater portions of the corner regions are irrigated without irrigating outside of the corner regions, but a highly uniform application of irrigating fluid is achieved.

According to another feature of the invention, programmable timers are provided to adjustably determine the duration of the periods during which the main pipeline sprinkler is operating at the substantially constant and zero pivotal speeds. The timers thus determine the duration of the periods of operation of the auxiliary nozzles; i.e., the amount of irrigating fluid discharged to the corner regions. Because the pivotal rate of the main pipeline sprinkler is zero during operation of the extended range nozzle, the volume of fluid delivered to the corner areas may be controlled substantially independently of the volume applied to the central area by the main pipeline sprinkler.

As another feature of the invention, a disable mechanism is provided for selectively disabling the auxiliary sprinkler for one or more corners during a rotational cycle of the main pipeline sprinkler. The disable mechanism allows the user to selectively skip the irrigation of one or more particular corners which need not be irrigated; for example, because of the presence of buildings, etc.

According to still another feature, the auxiliary system is failsafe. Upon a malfunctioning of the auxiliary sprinkler system, it is disabled, and only the main pipeline sprinkler is allowed to continue operation. Similarly, the auxiliary system may be completely disabled, if desired by the user, to allow operation of only the main pipeline sprinkler for irrigating only the inner, circular area.

It is accordingly a general object of the present invention to provide a new and improved center pivot irrigation system which is economical to produce and use and which provides corner watering capabilities.

The above noted and other features of the present invention will become more apparent upon considering the following detailed description of a preferred embodiment when read in conjunction with the drawings; wherein

DESCRIPTION OF A PREFERRED EMBODIMENT

Figure 1:
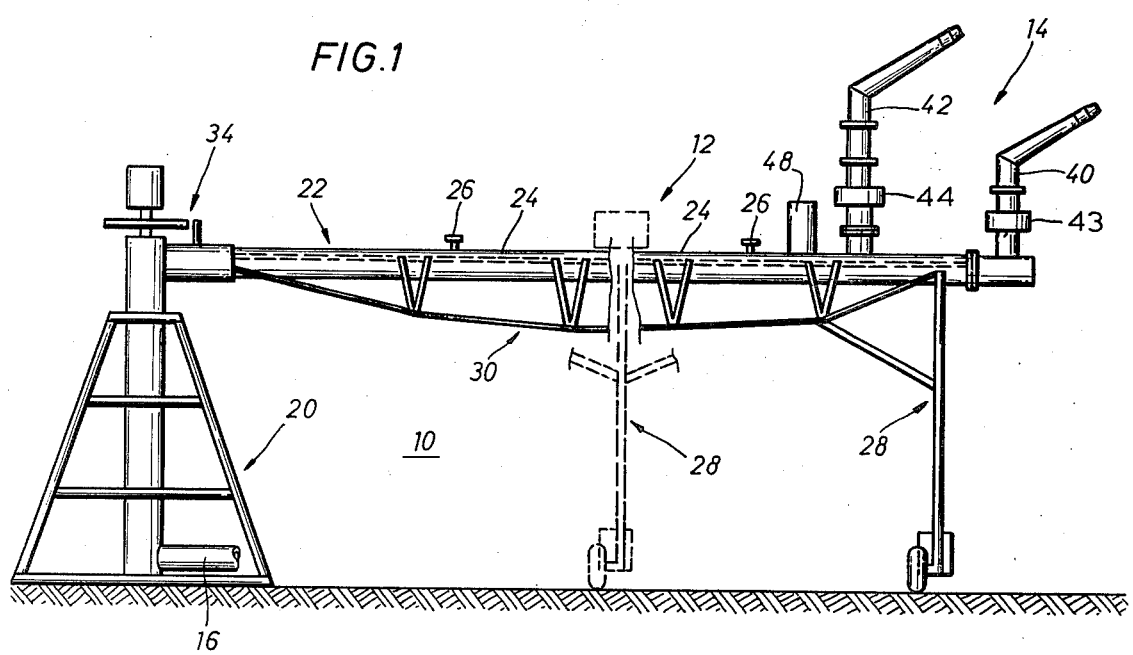
FIG. 1 is a schematic side view of a center pivot irrigation system having a blown-up view schematically showing two auxiliary nozzles.

Referring now to FIG. 1, a center pivot irrigation system 10 includes a main pipeline sprinkler system 12 and an auxiliary sprinkler system 14. The main pipeline sprinkler system 12 is coupled to a water supply 16 at a central pivot point for irrigating a central, generally circular area about the pivot point (see area A in FIG. 2). The auxiliary sprinkler system 14 is disposed substantially at the end of the main pipeline sprinkler system 12 opposite the water supply 16. The auxiliary sprinkler system 14 is selectively operated as the main pipeline sprinkler system 12 pivots for irrigating substantial portions of corner regions (see area B in FIG. 2) of generally rectangular plots requiring irrigation.

The water supply 16 includes an irrigation supply pump and power equipment therefore. The pump is of a design to provide adequate pressure as required for properly operating the auxiliary system 14.

The main pipeline sprinkler system 12 includes a pivot stand assembly 20 coupled to the water supply, and a long boom 22 pivotally connected to the pivot stand 20. The boom 22 includes a plurality of sections of pipe 24 which are connected end to end to provide a length ranging from several hundred feet to, for example, more than 1500 feet. The pipe 24 is directly connected to the water supply 16 and is of a sufficient inside diameter to convey water therefrom at a rate of over 1200 gallons per minute.

The boom 22 carries a plurality of primary fluid dispensing nozzles 26 disposed at spaced intervals along the sections of interconnected pipe 24. Some thirteen towers may be provided with a spacing between towers preferably of approximately 125 feet. The boom 22 also carries diaphragm type hydraulic valves (not shown) coupled in fluid passing communication between the pipe 24 and the primary nozzles 26. Additionally a control tube (not shown) for the hydraulic valves is carried by the boom 22. The control tube is connected to all the hydraulic valves for controlling operation of all the primary nozzles 26. Pressure to the control tube is controlled by a pair of feed/bleed valves (hereafter the FEED/BLEED valves).

One of the FEED/BLEED valves is located at the pivot stand assembly 20. The second FEED/BLEED valve is positioned approximately ⅔ of the distance from the pivot stand assembly 20 to the end tower. It has been determined that approximately half of the total water flow is released during the first ⅔ of the length of the boom. Therefore, the second FEED/BLEED valve is connected at the ⅔ distance.

When pressure within the control tube is bled to atmosphere, the hydraulic valves open, allowing discharge of the irrigating fluid (i.e. water) through the primary nozzles 26. Conversely, pressure, i.e., water pressure, within the control tube above a threshold valve, renders the valves into a closed condition, preventing discharge through the nozzles 26.

The sections of pipe 24 are supported by a plurality of motor driven towers 28 disposed at the intersections of the sections of pipe 24 and by pipe supporting trusses 30 connecting adjacent towers 28. A supporting truss also connects the first tower to the pivot stand assembly 20. The towers 28 and the trusses are constructed and arranged to provide a ground clearance of approximately nine feet with a minimum of wind resistance. Each of the towers 28 carries a set of wheels and a tower motor for driving its wheels and thereby effecting pivoting or rotation of the boom 22 about the pivot stand assembly 20.

A control system 32 (see FIGS. 3a–3c) controls energization of the end tower motor to rotate the boom 22 about the pivot stand assembly at operator specified pivotal or rotational rates. An alignment system is provided (not shown) for operating the remainder of the tower motors to maintain the sections of pipe 24 in alignment. The alignment system employs a tension wire stretched along the boom and employs mechanical linkage responsive to movements in the tension wire to actuate microswitches for respective tower motors. Actuation of the microswitches energizes the appropriate tower motor to bring the sections of pipe into alignment.

The control system 32 includes an angle sensor 34 for providing signals in response to and indicative of the rotational position of the boom 22 about the stand assembly 20. One embodiment of the angle sensor 34 utilizes cam operated switches. The cam rotates according to the pivotal movement of the boom 22 and has lobes which actuate the switches to generate signals representative of the orientation of the boom 22 about the pivot stand assembly 20.

According to an outstanding feature of the invention, the control system 32 drives the boom 22 about the pivot stand assembly at intermittent rates while controlling fluid discharge from the sprinkler systems 12 and 14. Fluid is discharged in accordance with the pivotal rate to maintain uniformity of irrigation within the central, generally circular area as well as in substantial portions of corner regions. The control system 32 is also advantageously designed to allow operation of the system 10 with or without operation of the auxiliary sprinkler system 14 according to the desires and needs of the operator. Furthermore, the control system 32 allows one or more corner regions not requiring irrigation to be skipped, such as corners having farm buildings, roads, etc.

The described center pivot irrigation system may offer operational features such as: (1) low pressure and temperature shutdown whereby the operation of the system 10 is automatically discontinued in the event of a drop in the irrigation fluid pressure below a threshold value or a drop in the ambient air temperature below a preselected value; (2) automatic reversing whereby the irrigation of any section of a field may be accomplished by cycling the boom 22 back and forth over a given section; (3) a preselected stop feature whereby operation of the system may be automatically stopped at any predetermined orientation of the boom 22 about the stand assembly 20; (4) overwatering detection whereby the system is automatically shut down if, while continuing to discharge irrigation fluid, a malfunction causes stopping of the rotation of the boom 22 for a predetermined period of time; and (5) an adjustable high level pressure switch to protect the system from high pressure surges caused by malfunctions of the sprinkler systems 12, 14. All such options are suitably contemplated as part of the invention and are not only briefly described in conjunction with the control system 32.

The main pipeline sprinkler system 12 as described is generally well known in the art, and its operation is well understood. For example, the model 2200 Center Pivot Irrigation System marketed by Lockwood Corporation, Gering, Nebr., is generally of this construction and is readily modified, for example, to include the control tube and hydraulic valves as above described. Accordingly, the main pipeline sprinkler system 12, its alignment system, and its control system 32 are not described in great detail; they are only described in as much detail as necessary for an understanding of operation of the auxiliary sprinkler system 14.

Figure 4A:
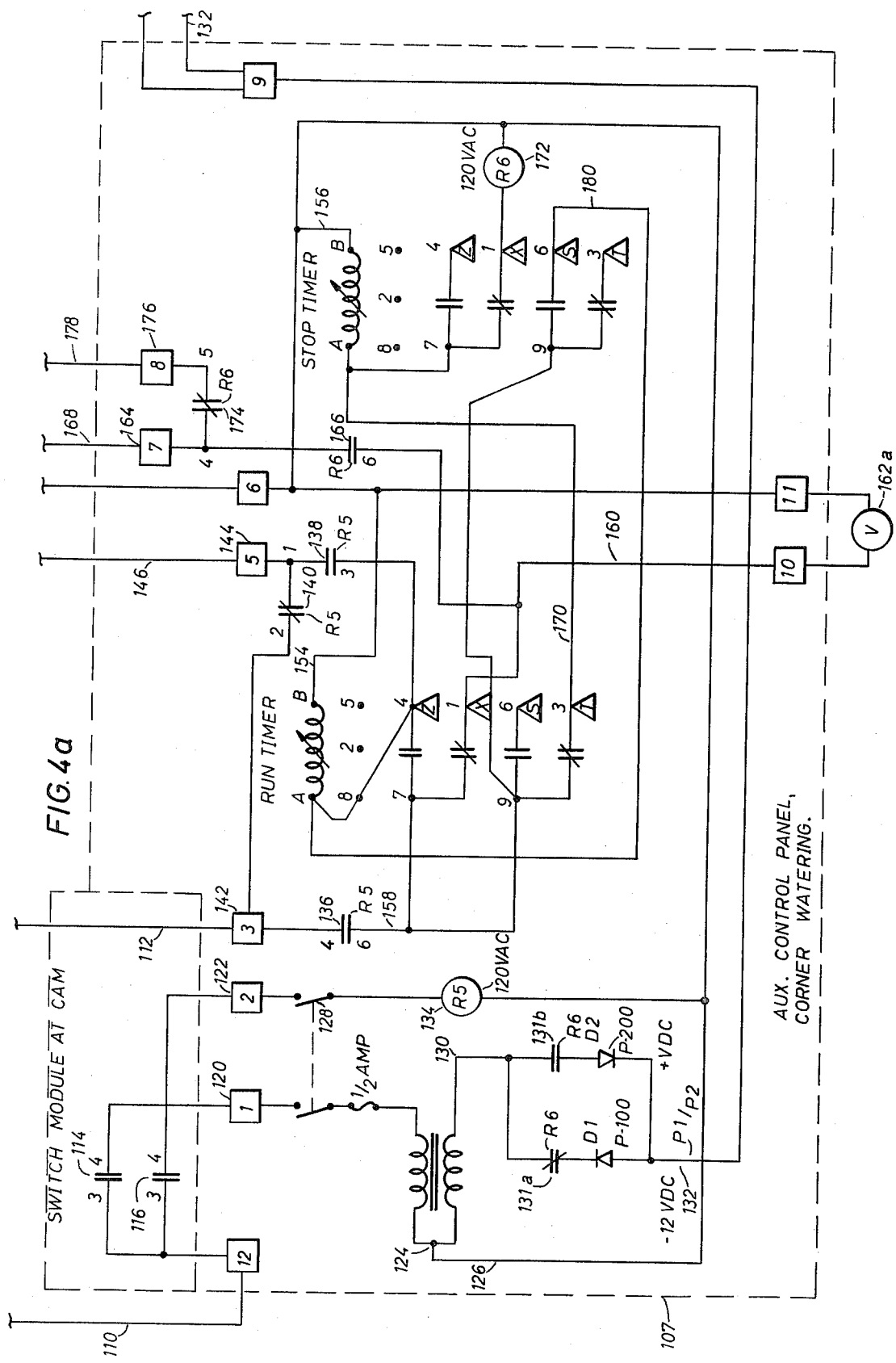
FIGS. 4a–4b are electrical schematics of a control system for an auxiliary sprinkler system which includes the auxiliary nozzles of FIG. 1.
Figure 4B:
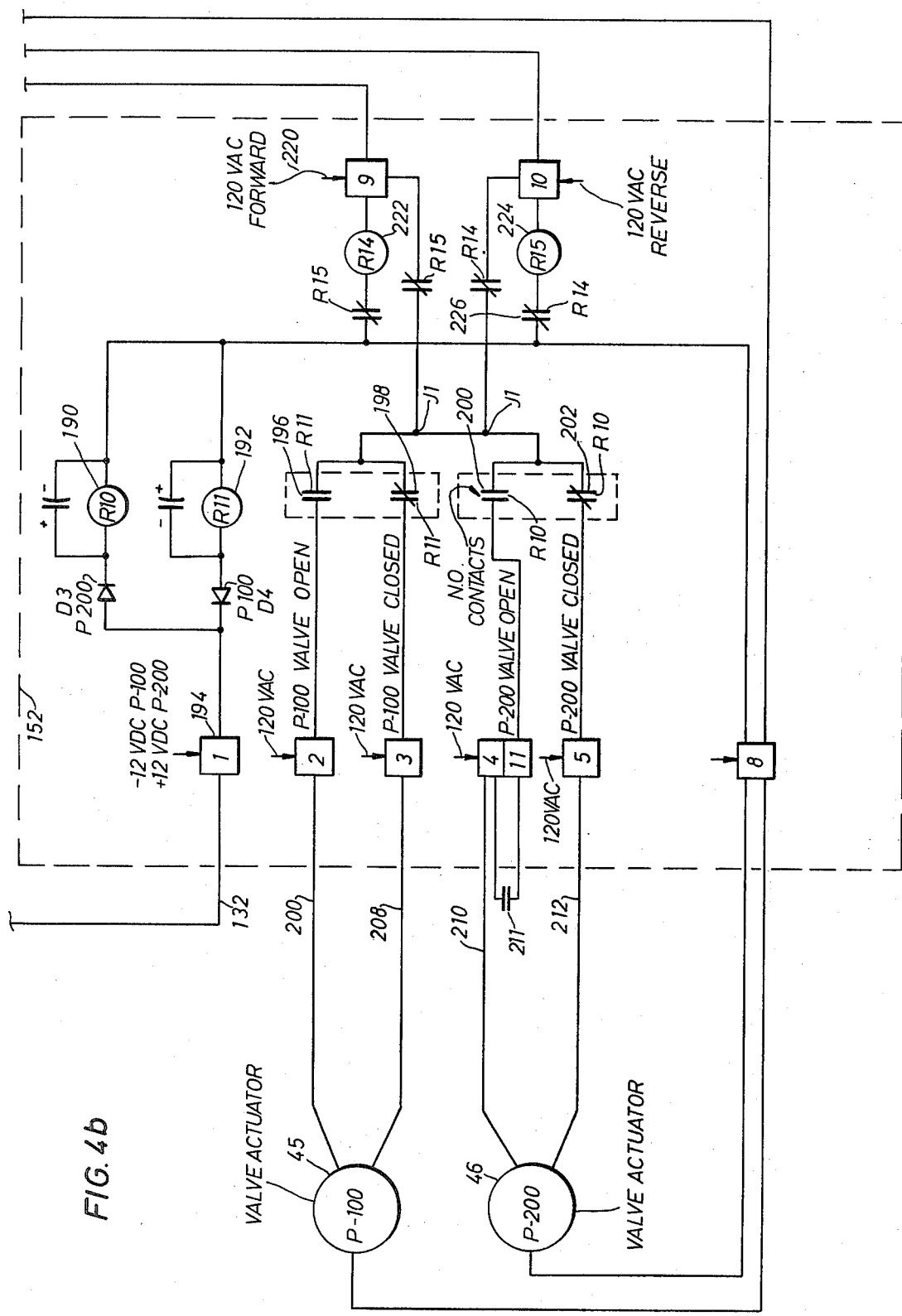

Referring now to the auxiliary sprinkler system 14, first and second auxiliary nozzles 40, 42 respectively are disposed substantially at the end of the boom 22 on the last section of pipe 24 (i.e., at the last tower 28). The nozzles 40, 42 are coupled respectively to valves 43, 44 which are carried on the last pipe section of the boom in fluid passing relationship with the pipe. Operation of the valves 43, 44 is controlled by respective valve actuators 45, 46 which open and close the valves 43, 44 according to control signals from a control system 48 (FIGS. 4a4b). The first nozzle 40 is of a relatively lesser size and the second nozzle 42 is of a relatively greater size to respectively discharge lesser and greater volumes of irrigating fluid. The nozzles 40, 42 are disposed to rotatingly provide (referring to FIG. 2) irrigation respectively to inner (P1) and outer (P2) peripheral corner regions.

The nozzles 40, 42 in the preferred and illustrated embodiment are commercially available from Nelson Irrigation Corporation as models P100 and P200 sprinklers respectively. The model P200 sprinkler is modified to provide a 21 degree trajectory, rather than the 27 degree trajectory specified by the manufacturer. The P200 and P100 sprinklers are each equipped with a secondary nozzle which is not utilized in the preferred embodiment. Use of such secondary nozzle could be designed into the system 10 according to the teachings of the present invention.

Figure 2:
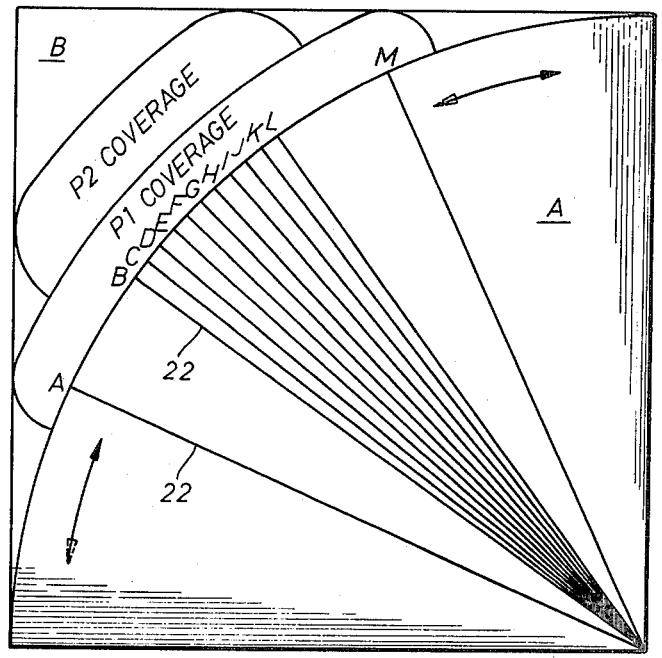
FIG. 2 is a schematic diagram of a corner plot showing operation of the center pivot irrigation system of FIG. 1.

The control systems 32, 48 operate the primary nozzle hydraulic valves and the valve actuators 45, 46 in a relationship with one another and to the pivotal speed of the boom 22 in a manner to provide a highly uniform application of irrigating fluid. Referring to FIG. 2, as the boom 22 pivots towards point A, the auxiliary sprinkler system 14 is completely disabled, effecting irrigation of only the central, generally circular area A by the main pipeline sprinkler system 12. This mode of operation with only the main pipeline sprinkler 12 operating will hereafter be referred to as the NORMAL mode of operation. During the NORMAL mode of operation, the sprinkler 12 is said to rotate at a substantially constant rate. This term, substantially constant, is understood to describe the operation wherein the sprinkler 12 is either continuously rotating or is intermittently rotating due to operation of a percentage TIMER, as will hereafter be described in detail.

When the boom 22 reaches point A, the angle sensor 34 generates a control signal which excites the valve actuator 45 for the valve 43 to discharge fluid through the first auxiliary nozzle 40. The boom 22 continues to pivot, and the first auxiliary nozzle 40 sprays the P1 inner peripheral corner area. The auxiliary nozzle 40 rotates about the end of the boom 22 at a rate considerably faster than the pivotal rate of the system, effecting irrigation on both sides of point A outside the inner circular area A. As the boom 22 travels from point A towards point B, the primary nozzles 26 and the auxiliary nozzles 40, continue to discharge the irrigating fluid. This mode of operation, with the boom 22 pivoting and with the primary nozzles 26 and the auxiliary nozzles 40 open, will be referred to as the P1 mode of operation. During this mode of operation the volume of fluid supplied to the boom 22 and the pressure of the supplied fluid is sufficient to allow continued uniform application of fluid to the inner circular area, notwithstanding the drain due to operation of the auxiliary nozzle 40.

When point B is reached, the angle sensor 34 generates a signal to the control systems 32, 48 which: (1) deenergizes the tower motors, stopping the pivoting of the boom 22; (2) closes the valve 43 for the first auxiliary nozzle 40; (3) opens the valve 44 for the second auxiliary nozzle 42; and (4) renders the FEED/BLEED valves into the feed position for allowing pressure into the control tube. Pressure within the control tube increases closing the hydraulic valves for the primary nozzles 26. Pressure begins to rise in main sprinkler line as the primary nozzles begin to shut off. When the threshold pressure is reached at the pressure switch the contact conducts to send an opening signal to the auxiliary nozzle 42. This assures sufficient pressure at the nozzle 42 before the valve will open, minimizing crop damage and soil erosion. Thus, the pressure switch effects operation of the valve actuator 46 corresponding to the second auxiliary nozzle 42. The control system 48 thereupon energizes a timer, referred to as the STOP timer, for a predetermined period of time to allow irrigation by only the second auxiliary nozzle 42. This mode of operation will be referred to as the P2 mode of operation.

This stopping of the pivoting of the boom 22 while only the nozzle 42 is discharging fluid is an outstanding feature of the invention as it allows all of the fluid supplied to the boom 22 to be provided to the nozzle 42 for irrigating the second peripheral corner region P2. Because the fluid is no longer being discharged through the primary nozzles 26 or through the first auxiliary nozzle 40, sufficient volume and pressure is provided to the second auxiliary nozzle 42 to obviate the otherwise need for a booster pump for operating this high volume auxiliary nozzle.

After a predetermined period of time, the STOP timer times out and causes the control system 48 to generate a control signal which de-energizes the valve actuator 46 for stopping discharge through the second auxiliary nozzle 42. Timing out of the STOP timer also effects energization of the valve actuator 45 for opening the first auxiliary nozzle 41, as well as opening the FEED/BLEED valves to atmosphere for bleeding the control tube and thereby opening the hydraulic valves for the primary nozzles 26. At this time the tower motors are also energized for restarting pivoting of the boom 22 about the pivot stand assembly 20. The P1 mode of operation is thereby re-effected for a period of time determined by another timer, referred to as the RUN timer.

As the boom 22 pivots from the point B toward the point C, the nozzles 26 and 40 discharge fluid into the circular area and into the first peripheral corner region according to the P1 mode of operation. After a predetermined period of time, the RUN timer times out, causing de-energization of the value actuators 45, switching the FEED/BLEED valves to the FEED position, and de-energizing the tower motors, thereby terminating the P1 mode of operation and re-initiating the P2 mode of operation. The described process of intermittent pivotal motion and fluid discharge continues for points D through L. The intermittent motion between points B and L, comprising the second and following P1 modes and all the P2 modes, defines the P3 mode of operation.

Between the points L and M, the system 10 operates in the P1 mode; thereafter and until point A is again reached on the next pivotal cycle, the system 10 operates in the NORMAL mode of operation.

Having described the general modes of operation of the center pivot irrigation system 10, the details of the control systems 32, 48 as shown in FIGS. 3a–3c and 4a–4b are more easily understood.

Figure 3A:
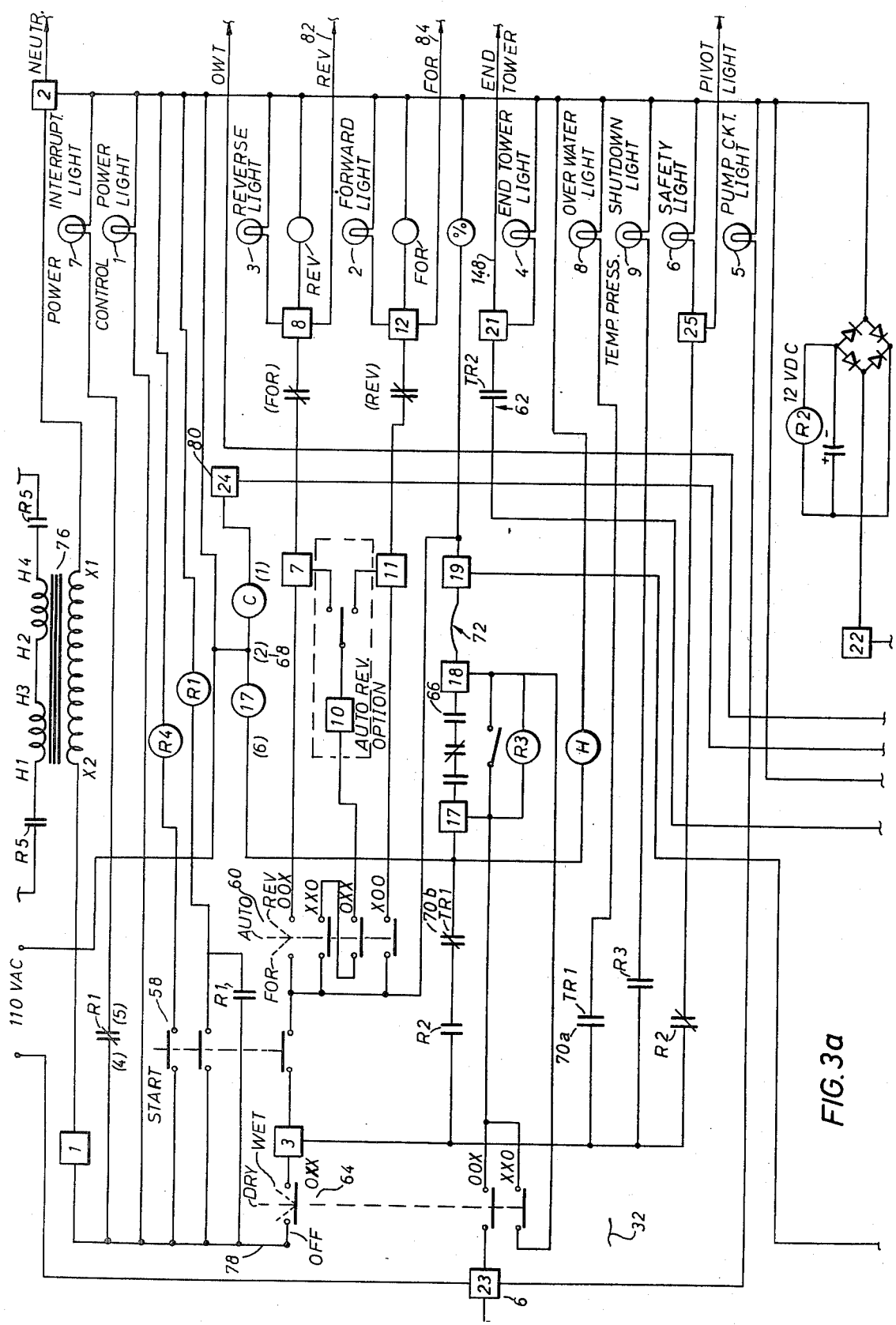
FIGS. 3a–3c are electrical schematics of a control system for a main pipeline sprinkler system of the center pivot irrigation system shown in FIG. 1.
Figure 3B:
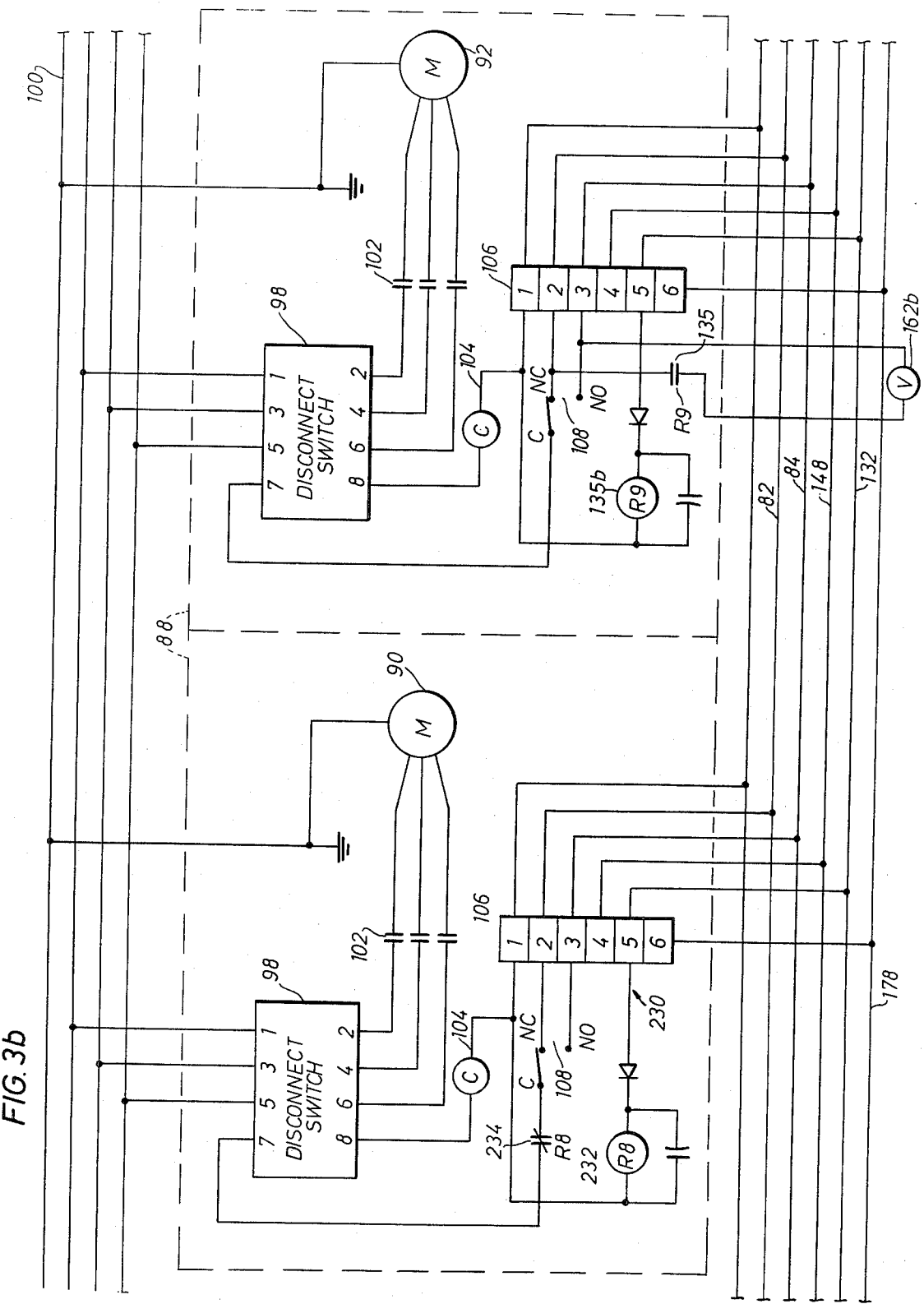
Figure 3C:
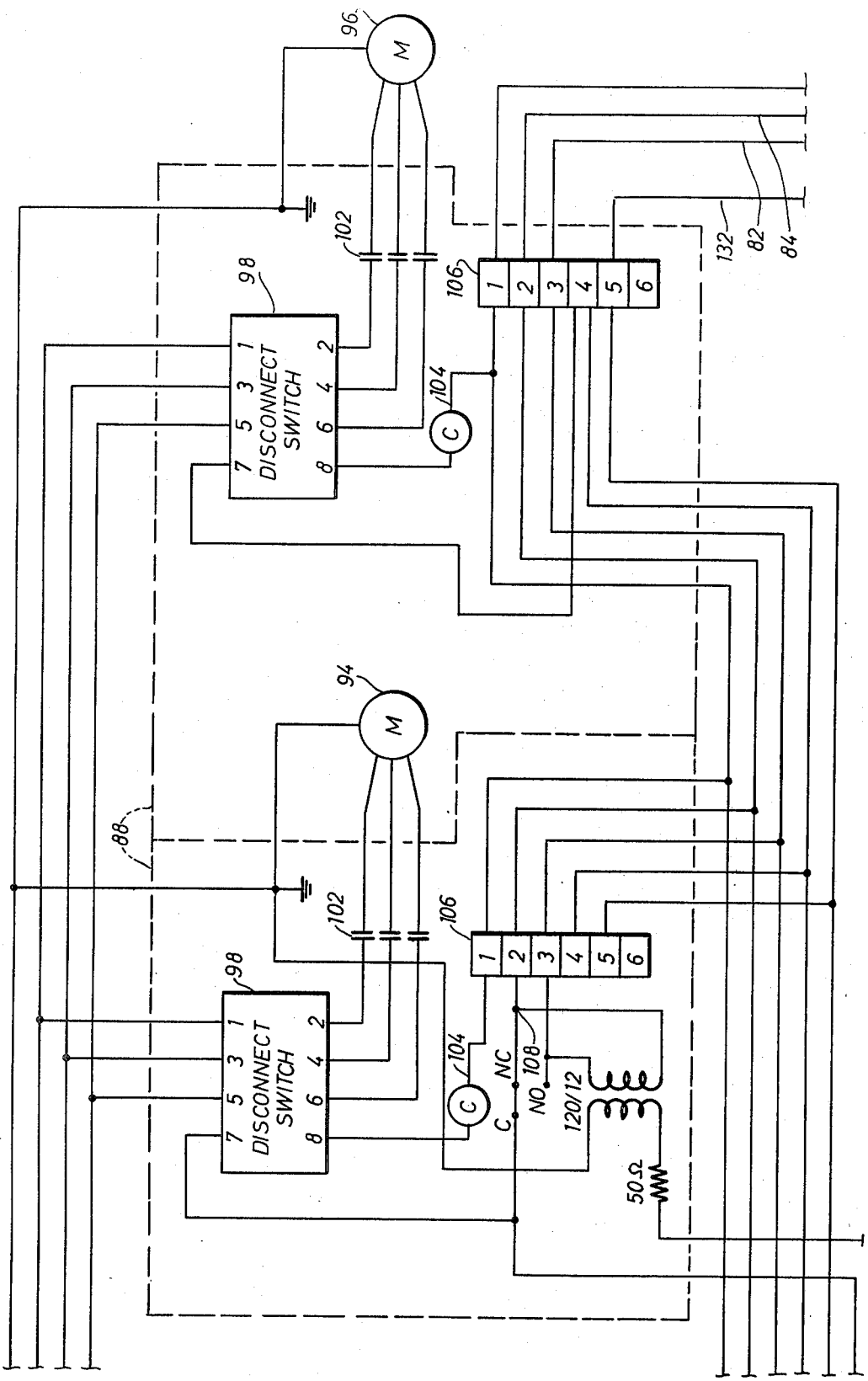

Referring now to FIGS. 3a–3c, the control system 32 includes a plurality of manually operated input switches, dials, and mechanisms for allowing the operator of the system to program desired operation of the main pipeline sprinkler system 12. A switch 58 is provided for initializing system operation. A PERCENTAGE TIMER is provided having contacts 62 which open and close at a rate which controls the rate at which the boom 22 pivots about stand 20. Typical pivotal rates for a standard system having a boom 22 of about a ¼ mile length are 18.8 hours to 188 hours per pivotal cycle. A FWD-AUTO-REV switch 60 is provided for specifying whether the boom 22 rotates in the forward only or reverse only directions, or whether it operates first in one direction and then in another direction for successive pivotal cycles. An OFF-DRY-WET switch 64 is provided for enabling operation of the main pipeline sprinkler system 12 in either a WET or a DRY mode whereby irrigation fluid is either delivered or not delivered respectively during the pivotal motion of the boom 22.

The control options are shown in FIG. 3a as follows: Low PRESSURE/TEMP switch contacts are shown at reference numeral 66; the OVERWATERING TIMER at 68, its TR1 contacts at 70; and the preselected stop switch at 72.

Briefly, operation of the control system 32 for the main pipeline sprinkler system 12 is as follows. A step down transformer 76 provides 120 VAC to the OFF-DRY-WET switch 64 and the START switch 58 via a line 78. Actuation of the START switch 58 provides energization to the OVER-WATERING TIMER 68 so that, upon motion of the boom 22 inadvertently stopping, such as the wheels of the towers becoming stuck, the timer 68 can terminate further operation of the irrigation system 10 if irrigation at one orientation about the pivot stand assembly 20 should proceed beyond a predetermined period of time. A clutch contact 80 is provided for selectively disabling operation of the timer 68.

Concurrent operation of the start switch 58 and of the OFF-DRY-WET switch 64 provides energization to the FWD-AUTO-REV switch 60 when the switch 64 is in either the DRY or WET position. Depending upon the position of the FWD-AUTO-REV switch 60, the 120 VAC is applied to either a REV line 82 or to a FOR line 84 coupled to a set of control circuits 88 for the tower motors. Operation of the remaining circuitry shown in FIG. 3a is obvious and accordingly will not be explained in further detail, as its operation is unchanged from that of the Model 2200 Center Pivot Irrigation System marketed by Lockwood Corporation.

Referring now to FIGS. 3b and 3c, control circuits 88 of the control system 48 for operating the tower motors is shown in detail. The tower closest to the pivot stand assembly 20 is denoted by the reference numeral 90 and will be referred to as the first tower motor. The motor corresponding to an intermediate tower is denoted by the reference numeral 92 and will be referred to as the intermediate motor. The motor for the next to end tower is denoted by the reference numeral 94 and will be referred to as the next-to-end motor; and the end tower motor is denoted by the reference numeral 96.

Each of the tower motor control circuits 88 includes: a disconnect switch 98 to which 480 VAC is applied by a set of lines 100; a contactor 102 coupling the respective disconnect switch 98 to its tower motor; a coil 104 for each of the contactors 102; and a terminal strip 106. The FOR wire 84 and the REV wire 82 are respectively coupled to the third and second terminals on each of the terminal strips 106.

Each of the circuits 88, except the end tower circuit which is controlled by the percentage contacts 62, further includes the microswitch, denoted at 108, which was earlier mentioned with respect to the alignment system. The switch 108 is connectable to either the FOR line 84 or to the REV line 82 according to the direction of rotation of the boom 22 and controls energization of the coil 104 for each respective motor.

Operation of the tower motor control circuits 88 will be described subsequently in connection with the overall control system 48.

Referring now to the control system 48 shown in FIG. 4a, a TIMER circuit 107 which is disposed at the pivot stand assembly 20 is shown in detail in connection with the control system 32. A wire 110 is connected to the OFF-DRY-WET switch 64, and a wire 112 is connected to the PRESELECTED STOP switch 72. Via the wires 110 and 112, 120 VAC is provided respectively when the switch 64 is in the WET position and during all of the NORMAL, P1, and P3 modes of operation. A pair of contacts 114, 116 are commonly coupled to the wire 110 and are actuated by the angle sensor 34. As earlier indicated, the angle sensor 34 is a cam operated switch which mechanically opens and closes the contacts 114, 116 respectively according to travel of lobes on a cam at the pivot stand assembly 20. The contact 114 is associated with operation of the lower volume auxiliary nozzle 40 and will be referred to as the P1 contact. The contact 116 corresponds to operation of the system during the P3 mode of operation, and will be referred to as the P3 contact. Closure of the P1 contact 114 provides 120 VAC to an input terminal 120 during the P1 mode of operation. Closure of the P3 contact 116 provides 120 VAC an input terminal 122. During the P3 mode of operation, both the P1 and P3 contacts 114, 116 are rendered closed, providing 120 VAC to both of the terminals 120, 122.

A step down transformer 124 is coupled to circuit ground by a line 126 and to the input terminal 120 via an isolation switch 128. Closure of the switch 128 provides 12 VAC on a line 130 whenever the contacts P1, is closed. A diode D1 has its cathode connected to a normally closed R6 contact 131a, and the series connection couples the line 130 to a P1/P2 line 132. Whenever the system is operating in the P1 mode, −12 volts is applied to the P1/P2 line 132 via the normally closed contacts R6 and diode D1 for controlling the valve 45.

The P1/P2 line 132 is also coupled to the line 130 by a series connection of a normally open set of R6 contact 131b and a diode D2 having its anode closest to the contacts R6. Whenever the system is operating in the P2 mode, +12 VDC is thereby applied to the P1/P2 line 132.

The line 132 is coupled to an end tower valve control circuit 152 and to the fifth terminals of the terminal strips 106 of the tower control circuits 88 for the first tower and for the tower carrying the second FEED/BLEED valve which is denoted by the numeral 162b. The valve 162b is controlled by a set of normally open R9 contacts 135 corresponding to an R9 coil 135b connected to line 132. Only when +12 VDC is applied to the line 132 is the coil R9 energized, thereby allowing the switching of the valve 162b into the FEED state for closing the primary nozzles 26. The +12 signal VDC on the line 132 also controls the valve actuator 46 of the second auxiliary nozzle 42 via the control circuit 152.

An R5 coil 134 is connected between circuit ground and the terminal 122 via another set of contacts of the isolation switch 128. During the P3 mode of operation, the 120 VAC applied to the terminal 122 energizes the R5 coil 134.

The R5 coil 134 has two sets of normally open contacts R5 which are designated by the numerals 136, 138 and one set of normally closed contacts R5 which are designated by the numeral 140. The normally open R5 contacts 136 and the normally closed R5 contacts 140 are commonly connected to the wire 112 at a terminal 142 for receiving 120 VAC during all modes of operation. The normally closed R5 contact 140 has its other terminal coupled to an output terminal 144 which in turn is connected to the contacts 62 of the PERCENTAGE TIMER by a line 146.

During the P1 mode of operation, the normally closed R5 contacts 140 provide 120 VAC to the contacts 62 for intermittently running the end tower. The contacts 62 open and close according to the setting of the PERCENTAGE TIMER, thereby controlling the speed of rotation of the boom 22 about the pivot stand assembly 20. This intermittent 120 VAC signal is sent to the end tower motor control circuit 88 for driving the end tower motor 96 via a line 148.

The line 148 is connected to the fourth terminal of the terminal strip 106 in the motor control circuit 88. From this terminal, a wire selectively energizes, through the disconnect switch 98, coil 104 for the contactor 102 according to whether the system mode of operation is the normal mode, P1 mode or the P2 mode, during the normal and P1 modes of operation, 120 VAC, as controlled by the PERCENTAGE TIMER contact 62, is intermittently applied to the coil 104 for energizing the end tower motor 96. Thus, the boom 22 can pivot about the pivot stand assembly 20 during either the normal or P1 modes of operation.

The other terminal of the normally open R5 contact 136 is connected to the RUN TIMER, denoted by the numeral 154, and to the STOP timer which is denoted by the numeral 156. The RUN TIMER 154 has a primary input terminal A, a set of output terminals Z, X, T and secondary input terminals for each of the respective Z, X, T output terminals. The STOP TIMER 156 has its primary input terminal A, a pair of output terminals X, S, and secondary input terminals for the respective output terminals X, S. The other terminal of the normally open R5 contact 136 is connected via a line 158 to all the secondary input terminals of the RUN TIMER 154 and to the secondary input terminal for the S output terminal of the STOP TIMER 156. The output terminal 144 is coupled to the Z output terminal of the RUN TIMER 154 by the normally open R5 contacts 138.

The X output terminal of RUN TIMER 154 is connected by a line 160 to the first FEED/BLEED valves, denoted by numeral 162a. The X output terminal is also coupled to an output terminal 164 via a normally open R6 pair of contacts 166. At the output terminals 164, a 120 VAC signal is applied via a line 168 to the terminal 80 for maintaining the clutch of the OVERWATERING TIMER 68 energized so that the timer does not time down and disable the system when the machine is in the P2 mode.

The T output terminal of the RUN TIMER 154 is connected by a wire 170 to the primary input terminal of the STOP TIMER 156.

The X output of the STOP TIMER 156 is coupled to an R6 coil 172. The R6 coil 172 has its normally closed R6 contact 131a coupled to the diode D1, has normally open R6 contacts 131b coupled to the diode D2, has the normally open R6 contacts 166 coupled to the X output of the RUN TIMER 154, and has a normally closed R6 contact 174 coupling the output terminal 164 to an input terminal 176. A line 178 connects the input terminal 176 to the tower motor control circuit 88 corresponding to the next to end tower for providing 120 VAC through the normally closed R6 contacts 174 to the line 168 for maintaining energization of the OVERWATERING TIMER clutch during the intermittently "ON" portion of the normal mode and P1 mode.

The S output of the STOP TIMER 156 is connected by a line 180 to the primary input of the RUN TIMER 154.

The states of the RUN and STOP timers 154, 156 are given by Tables I and II.

TABLE I

| | RUN TIMER LOGIC | | |
|---|---|---|---|
| Output Terminal | Before Start | During Timing | End of Cycle |
| Z | 0 | 1 | 0 |
| X | 1 | 0 | 1 |
| T | 1 | 0 | 1 |

TABLE II

| | STOP TIMER LOGIC | | |
|---|---|---|---|
| Output Terminal | Before Start | During Timing | End of Cycle |
| X | 0 | 1 | 0 |
| S | 0 | 0 | 1 | where "0" represents open contacts and "1" represents closed contacts.

Referring now to FIG. 4b, the end tower valve control circuit 152 is shown in detail for selectively energizing the valve actuators 45, and 46. An R10 coil 190 and an R11 coil 192 are respectively connected through oppositely poled diodes D3, D4 to a terminal 194 which in turn is connected to receive the P1/P2 wire 132. The other terminal of each of the coils 190, 192 is connected to circuit ground such that, upon application of the −12 VDC signal on the line 132, the coil R11 is energized; upon application of the +12 VDC signal on the line 132, the R10 coil 190 is energized.

The R11 coil has a normally open set of R11 contacts 196 and a normally closed set of R11 contacts 198. The coil R10 has first and second sets of normally closed R10 contacts 202, and a set of normally open R10 contacts 200. Whenever the line 132 provides a −12 VDC signal for energizing the R11 coil 192 during the P1 mode of operation, energization to the valve actuator 45 is applied thereto via the contacts 196 and a line 206. When the R11 coil 192 is de-energized during the P2 mode of operation, the normally closed R11 contacts 198 provide a signal via a line 208 for disabling the valve actuator 45. Whenever a +12 VDC signal is applied to the line 132, the R10 coil 190 is energized, applying energization to the valve actuator 46 via the R10 contact 200, a pair of pressure contacts 211, and a line 210. The contacts 211 are those of a pressure switch in the pipe 24 and connect the line 210 and the normally open R10 contacts 200 such that the valve actuator 46 is actuated only upon the pressure within the pipe 24 achieving a preselected value, indication that the primary nozzles 26 have sufficiently closed. In the preferred embodiment, this pressure value is approximately 80 PSI. As a feature, the pressure switch provides differential programming such that the contacts 211 do not reopen until pressure in the control tube falls to approximately fifty-five PSI. Therefore, once the valve begins to open its opens fully.

When the +12 VDC signal disappears from the line 132 during the P1 mode of operation, the R10 coil de-energizes and the normally closed R10 contact 202 closes to provide 120 VAC to the valve actuator 46 for closing it.

To provide energization when desired to the actuators 45, 46, the contacts 196, 198, 200 and 202 are commonly coupled to a FOR/REV circuit 220 at a common node J1. The FOR/REV circuit 220 is connected to the lines 82, 84 for receiving 120 VAC when the boom 20 is pivoting in either the forward or the reverse direction. The circuit 220 includes an R14 coil 222 and an R15 coil 224 respectively coupled to the lines 82, 84. The R14 coil 222 has a pair of normally closed R14 contacts 226 respectively connected in series between the R15 coil 224 and between the line 84 and the mode J1. The R15 coil 224 similarly has a pair of normally closed R15 contacts serially connecting the R14 coil 222 to circuit ground and connecting the wire 82 to the node J. In this manner, isolation between the wire 82, 84 is maintained while providing 120 VAC to the common junction J1 regardless of the direction of pivoting of the boom 22.

Operation of the control systems 32, 48 will now be summarized. As the boom 22 pivots towards a corner, a lobe on the P1 cam causes the P1 contacts 114 to close. This provides −12 volts DC on the P1/P2 line 132 which energizes the R11 coil 192. Energization of the R11 coil 192 closes the normally open R11 contacts 196 for energizing the valve actuator 45 for the first auxiliary nozzle 40. The primary nozzles 26 and the auxiliary nozzle thus both provide irrigation to the central area A and to the P1 peripheral area. 120 VAC from the line 112 is applied through the contacts 140 to the line 146 for maintaining movement of the boom about the pivot stand assembly 20. The pivotal rate of the boom 20 at this point is the same as during the normal mode of operation, as determined by opening and closing of the TR2 contacts 62 from the PERCENTAGE TIMER. That is, because the P3 contacts 116 are open, the R5 coil 134 is de-energized allowing 120 VAC to be applied through the normally closed R5 contacts 140 and the PERCENTAGE TIMER contacts 62 to the coil 104 for the end tower motor 96. P3 lobe on the angle sensor cam closes the P3 contacts 116 and maintains the P1 contacts 114 closed. This initiates the P2 mode of operation, energizing the R5 coil 134 which in turn closes the R5 contacts 136, 138 and opens the R5 contacts 140. Closing of the R5 contacts 136 switches the FEED/BLEED valve 162a into the FEED position whereby the pressure within the control tube begins to increase. Opening of the R5 contact 140 disrupts the 120 VAC through the contacts 62 and prevents movement of the boom 22 during the P2 mode.

Closure of the R5 contacts 136 also initiates the STOP TIMER 156 and energizes the R6 coil 172. Energizing of the R6 coil 172 effects application of a +12 VDC voltage on the P1/P2 line 132 which energizes the R10 coil 190 and switches the FEED/BLEED valve 162b to the feed position. The R10 contacts 200 close and the R10 contacts 202 open. As soon as pressure within the pipe 24 reaches the predetermined threshold level, the pressure switch 211 closes, and 120 VAC is applied to the valve actuator 46 to inititate discharge of fluid from the second auxiliary valve 42. Opening of the R5 contacts 140 disconnects line 112 from the line 144 for de-energizing the coil 104 of the end tower rotor 96.

After the STOP TIMER 156 has timed out, the R6 coil 172 de-energizes, causing: (1) the R6 contacts 131a to impose a −12 VDC on the line 132, which begins the sequence which opens the valve actuator 45, and closes the valve actuator 46 and (2) opening of the R6 contacts 166 and closing of the R6 contacts 174, imposing on the line 168 an intermittent 120 VAC signal to the OVERWATERING TIMER 68 whenever the next-to-end tower motor is energized.

Timing out of the STOP TIMER 156 also initiates operation of the RUN TIMER 154 via line 180. This provides energization to the terminal 144 from the Z output via the R5 contact 138 for providing energization to the PERCENTAGE TIMER contacts 62. Operation of the RUN TIMER 154 also disrupts energization to the FEED/BLEED valve 162a via the X output and the line 160. Accordingly, during the P1 phase of the P3 mode of operation when the RUN TIMER is timing down, (1) the control tube is bled to open the primary nozzles 26, (2) energization to the end tower motor 96 is reapplied for pivoting the boom 22, and (3) the valve actuator 45 is energized for causing discharge through the first auxiliary nozzle 40. Also during time out of the RUN TIMER 154, the STOP TIMER is de-energized via the T output and the line 170 from the RUN TIMER 154.

After the RUN TIMER 154 times out, and as long as the P3 mode of operation is commanded via the angle sensor 34, the STOP TIMER 156 is again enabled via the line 170 and the P2 mode of operation is again initiated. This sequence of P1 and P2 modes of operation continues until the P3 lobe on the angle sensor 34 rotates to open the P3 switch contacts 116. At this time, only P1 contacts are maintained closed via the P1 lobe, and only the P1 mode of operation results.

As a special feature of the invention, the first tower motor 90 is disabled simultaneously with each stopping of the end tower motor 96 to prevent false operation of the P1 or P3 contacts. This is accomplished by a disable circuit 230 connected to the P1/P2 line 132. The disable circuit 230 includes an R8 coil 232 and its normally closed R8 contacts 234. Whenever a +12 VDC signal is applied to the line 132, for stopping energizing of the end tower motor 96, the R8 coil 232 is also energized for opening the R8 contacts 234. This breaks the connection to the coil 104 for the first tower motor 90 from the FOR line 84 or from the REV line 82. The disable circuit 230 assures that the alignment system for the boom 22 does not cause a slight movement of the first tower after de-energization of the end tower motor 96 which could potentially cause the cam followers for the P1 and P3 switches to roll off their respective lobes.

Although rather specific embodiments of the invention have been disclosed, it is understood that such description has been by way of example only. Numerous changes and modifications will be apparent to those of ordinary skill in the art without departing from the spirit and scope of the invention.

What is claimed is:

1. A center pivot irrigation system adapted to provide corner irrigation comprising:
  (a) a main pipeline sprinkler rotatable about a center and having a plurality of main fluid discharge nozzles spaced therealong for controllably providing fluid to a central, generally circular area; said main nozzles being opened to discharge fluid at a main pipeline operating pressure less than a selected value and being closed to allow the operating pressure to increase to said selected value;
  (b) a drive mechanism for rotating the main pipeline sprinkler at a substantially constant first rate for irrigating areas corresponding to non-corner orientations, and at an intermittent rate for irrigating areas corresponding to corner orientations, the intermittent rate defined in part by a zero rate period during which the main pipeline sprinkler is substantially at rest; and
  (c) an auxiliary sprinkler, including at least one rotatably mounted auxiliary nozzle disposed substantially at the end of the main pipeline sprinkler, for irrigating said corner areas substantially only during said zero rate periods, said auxiliary sprinkler further including control means responsive to the main pipeline operating pressure for operating the auxiliary sprinkler upon the condition that pressure in the main pipeline sprinkler has exceeded said selected value indicative that there is substantially no discharge from the main fluid discharge nozzles.

2. A center pivot irrigation system according to claim 1 wherein the main pipeline sprinkler includes main nozzle control means operable during said zero rate period for selectively closing the main discharge nozzles and thus preventing discharge therethrough during said periods.

3. The center pivot irrigation system according to claim 2 wherein said main pipeline sprinkler includes a connector for connection to other such main pipeline sprinklers, thereby converting the first described main pipeline sprinkler into a mere fluid conveying conduit.

4. A center pivot irrigation system according to claim 1 wherein the main pipeline sprinkler further includes:
  (a) a main conduit for providing fluid to the main nozzles and to at least one auxiliary nozzle; and
  (b) a fluid supply connected to the main conduit for conveying fluid to both the main and auxiliary nozzles.

5. The center pivot irrigation system according to claim 1 wherein said intermittent rate is defined by the period of nonrotation and by a period during which the main pipeline sprinkler rotates at the substantially constant first rate.

6. The center pivot irrigation system according to claim 1 wherein said drive mechanism includes at least one timer for determining the duration of said zero rate period.

7. The center pivot irrigation system according to claim 1 and further including failsafe means for disabling the auxiliary sprinkler and resuming operation of the main pipeline sprinkler upon malfunction of the auxiliary sprinkler.

8. The center pivot irrigation system according to claim 1 and including disable means for selectively disabling the auxiliary sprinkler for one but not all corner orientations of each rotation of the main pipeline sprinkler.

9. The center pivot irrigation system according to claim 1 and including disable means for selectively disabling the auxiliary sprinkler for all corner orientations of each rotation of the main pipeline sprinkler.

10. The irrigation system according to claim 1 wherein said control means comprises means for maintaining operation of the auxiliary sprinkler, once it has been rendered into operation, until said main pipeline pressure has decreased to a value substantially less than said selected value.

11. In a center pivot irrigation system having a main pipeline sprinkler rotatable about a center for supplying a generally circular area with irrigating fluid, and having an auxiliary nozzle rotatably carried by the main pipeline sprinkler for irrigating corner regions, the improvement comprising means responsive to irrigating fluid pressure in the main pipeline sprinkler for operating the auxiliary nozzle to discharge irrigating fluid therethrough upon the occurrence of the conditions that
(1) the main pipeline sprinkler is substantially non-rotating;
(2) the main pipeline sprinkler has substantially ceased discharging irrigating fluid; and
(3) pressure in the main pipeline sprinkler has increased to a selected value, indicative that the main pipeline sprinkler has substantially ceased discharging the irrigating fluid.

12. The irrigation system according to claim 11 wherein said operating means comprises means for maintaining operation of the auxiliary nozzle, once it has been rendered into operation, until said main pipeline pressure has decreased to a value substantially less than said selected value.

13. The irrigation system according to claim 11 and including fail-safe means for disabling the auxiliary nozzle operating means and resuming operation of the main pipeline sprinkler upon malfunction of the auxiliary nozzle operating means.

14. In a center pivot irrigation system having a main pipeline sprinkler rotatable about a center for irrigating a generally circular area with irrigating fluid, and having an auxiliary nozzle rotatably carried by the main pipeline sprinkler for irrigating corner regions, the improved method of operating the system comprising the steps of
(a) substantially stopping rotation of the main pipeline sprinkler;
(b) substantially stopping discharge of the irrigating fluid from the main pipeline sprinkler when its rotation has stopped;
(c) detecting the pressure of the irrigating fluid in the main pipeline sprinkler;
(d) enabling operation of the auxiliary nozzle when the irrigating fluid pressure in the main pipeline sprinkler has increased to a selected value indicating that said step of substantially stopping discharge has been effected; and
(e) irrigating from the auxiliary nozzle upon the completion of steps a–d.

15. The method according to claim 14 and further including the step of maintaining said step of irrigating until said fluid pressure in the main pipeline sprinkler has decreased to a value substantially less than said selected value.

16. The method according to claim 14 and wherein said irrigation system has a means for operating the auxiliary nozzle and further including the steps of:
(a) ceasing irrigating from the auxiliary nozzle upon a malfunction of said auxiliary nozzle operating means; and
(b) thereafter resuming irrigating from said main pipeline sprinkler.

17. A center pivot irrigation system adapted to provide corner irrigation comprising:
(a) a main pipeline sprinkler rotatable about a center and having a plurality of main fluid discharge nozzles spaced therealong for controllably providing fluid to a central, generally circular area;
(b) a drive mechanism for rotating the main pipeline sprinkler at a substantially constant first rate for irrigating areas corresponding to non-corner orientations, and at an intermittent rate for irrigating areas corresponding to corner orientations, the intermittent rate defined in part by a zero rate period during which the main pipeline sprinkler is substantially at rest;
(c) an auxiliary sprinkler, including at least one rotatably mounted auxiliary nozzle disposed substantially at the end of the main pipeline sprinkler, for irrigating said corner areas substantially only during said zero rate periods; and
(d) fail-safe means for disabling the operation of the auxiliary sprinkler and resuming operation of the main pipeline sprinkler upon malfunction of the auxiliary sprinkler.

* * * * *

UNITED STATES PATENT AND TRADEMARK OFFICE
CERTIFICATE OF CORRECTION

PATENT NO. : 4,227,648

DATED : October 14, 1980

INVENTOR(S) : Huland L. Holloway et al.

It is certified that error appears in the above-identified patent and that said Letters Patent are hereby corrected as shown below:

Column 2, line 22, "hardward" should be --hardware--
Column 6, line 7, the word "not" should be deleted
Column 8, line 6, "value" should be --valve--
Column 12, line 29, "its" should be --it--

Signed and Sealed this

Sixth Day of October 1981

[SEAL]

Attest:

GERALD J. MOSSINGHOFF

Attesting Officer    Commissioner of Patents and Trademarks